United States Patent
Ghabbour et al.

(10) Patent No.: US 9,112,373 B2
(45) Date of Patent: Aug. 18, 2015

(54) CONTROL PILOT VEHICLE INTERFACE WITH NON-LOCAL RETURN TO GROUND

(75) Inventors: Youssef Ghabbour, Valls (ES); Miguel Angel Acena, Valls (ES)

(73) Assignee: Lear Corporation, Southfield, MI (US)

( * ) Notice: Subject to any disclaimer, the term of this patent is extended or adjusted under 35 U.S.C. 154(b) by 839 days.

(21) Appl. No.: 13/372,803

(22) Filed: Feb. 14, 2012

(65) Prior Publication Data

US 2013/0176002 A1 Jul. 11, 2013

Related U.S. Application Data

(60) Provisional application No. 61/583,684, filed on Jan. 6, 2012.

(51) Int. Cl.
| | |
|---|---|
| *H02J 7/00* | (2006.01) |
| *H02J 7/02* | (2006.01) |
| *H02J 7/04* | (2006.01) |
| *B60L 3/00* | (2006.01) |
| *B60L 3/04* | (2006.01) |
| *B60L 11/18* | (2006.01) |

(52) U.S. Cl.
CPC ................ *H02J 7/022* (2013.01); *B60L 3/003* (2013.01); *B60L 3/0069* (2013.01); *B60L 3/04* (2013.01); *B60L 11/1838* (2013.01); *H02J 7/045* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ...... H02J 7/0031; B60L 3/04; B60L 11/1816; B60L 3/0069

USPC ........... 320/104, 109; 180/65.1, 65.21, 65.29; 701/22; 903/903, 907
See application file for complete search history.

(56) References Cited

U.S. PATENT DOCUMENTS

| | | | | |
|---|---|---|---|---|
| 8,487,636 | B2 * | 7/2013 | Mitsutani et al. | 324/538 |
| 8,541,978 | B2 * | 9/2013 | Fukuo et al. | 320/109 |
| 8,768,563 | B2 * | 7/2014 | Nitzberg et al. | 701/31.6 |
| 2010/0079105 | A1 | 4/2010 | Iwanaga et al. | |

(Continued)

FOREIGN PATENT DOCUMENTS

| | | |
|---|---|---|
| CN | 201928055 U | 8/2011 |
| EP | 0715389 A1 | 6/1996 |

(Continued)

OTHER PUBLICATIONS

Chinese Office Action for corresponding Application No. 201210584072.6, mailed Oct. 23, 2014, 5 pages.

*Primary Examiner* — Richard V Muralidar
(74) *Attorney, Agent, or Firm* — Brooks Kushman P.C.

(57) ABSTRACT

A vehicle interface is contemplated to be operable with an Electronic Vehicle Supply Equipment (EVSE) system and a vehicle charging system to facilitate vehicle charging related operations. The vehicle interface may include one or more switches and a charger controller configured to facilitate communications between the EVSE system and the vehicle charging system. The vehicle interface may be configured to adapted to common mode interference and other influences resulting from connections between the vehicle interface and EVSE being referenced to earth ground and connections between the vehicle interface and other vehicle electronics being reference to a vehicle chassis ground.

20 Claims, 2 Drawing Sheets

(56) References Cited

U.S. PATENT DOCUMENTS

| | | |
|---|---|---|
| 2010/0156355 A1 | 6/2010 | Bauerle et al. |
| 2010/0228413 A1 | 9/2010 | Fujitake |
| 2011/0133694 A1 | 6/2011 | Song |
| 2011/0204847 A1 | 8/2011 | Turner |
| 2011/0279082 A1 | 11/2011 | Hagenmaier, Jr. et al. |
| 2013/0038283 A1* | 2/2013 | Acena et al. ............ 320/109 |
| 2013/0175988 A1* | 7/2013 | Ghabbour et al. ............ 320/109 |

FOREIGN PATENT DOCUMENTS

| | | |
|---|---|---|
| JP | S55119531 A | 9/1980 |
| JP | 2000004542 A | 1/2000 |
| JP | 2005198445 A | 7/2005 |

\* cited by examiner

CONTROL PILOT VEHICLE INTERFACE WITH NON-LOCAL RETURN TO GROUND

CROSS-REFERENCE TO RELATED APPLICATIONS

This application claims the benefit of U.S. provisional Application No. 61/583,684 filed Jan. 6, 2012, the disclosure of which is incorporated in its entirety by reference herein.

TECHNICAL FIELD

The present invention relates to interfaces used to facilitate charging operations associated with an Electronic Vehicle Supply Equipment (EVSE) system and a vehicle charging system, such as but not limited to systems configured to facilitate charging a high voltage DC vehicle battery with AC energy supplied from the EVSE system.

BACKGROUND

A switch, such as a transistor, a field effect transistor (FET), a metal-oxide-semiconductor field-effect transistor (MOSFET), a bipolar junction transistor (BJT) and the like may require a particular voltage differential in order to implement the desired control of the switch between an open position and a closed position. With respect to a NPN bipolar transistor, for example, a particular voltage differential may be required between a base and an emitter of the switch in order to achieve the desired control. The ability of a driver or other control circuit to produce the particular voltage differential may be influenced by interferences and other electrical associated with the system having the switch. One non-limiting aspect of the present invention contemplates addressing electrical interferences induced within a vehicle interface due to the vehicle interface having some components reference to a earth ground associated with an Electronic Vehicle Supply Equipment (EVSE) system and some components reference to a vehicle chassis ground associated with a low voltage battery included within a vehicle to be charged through the EVSE system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
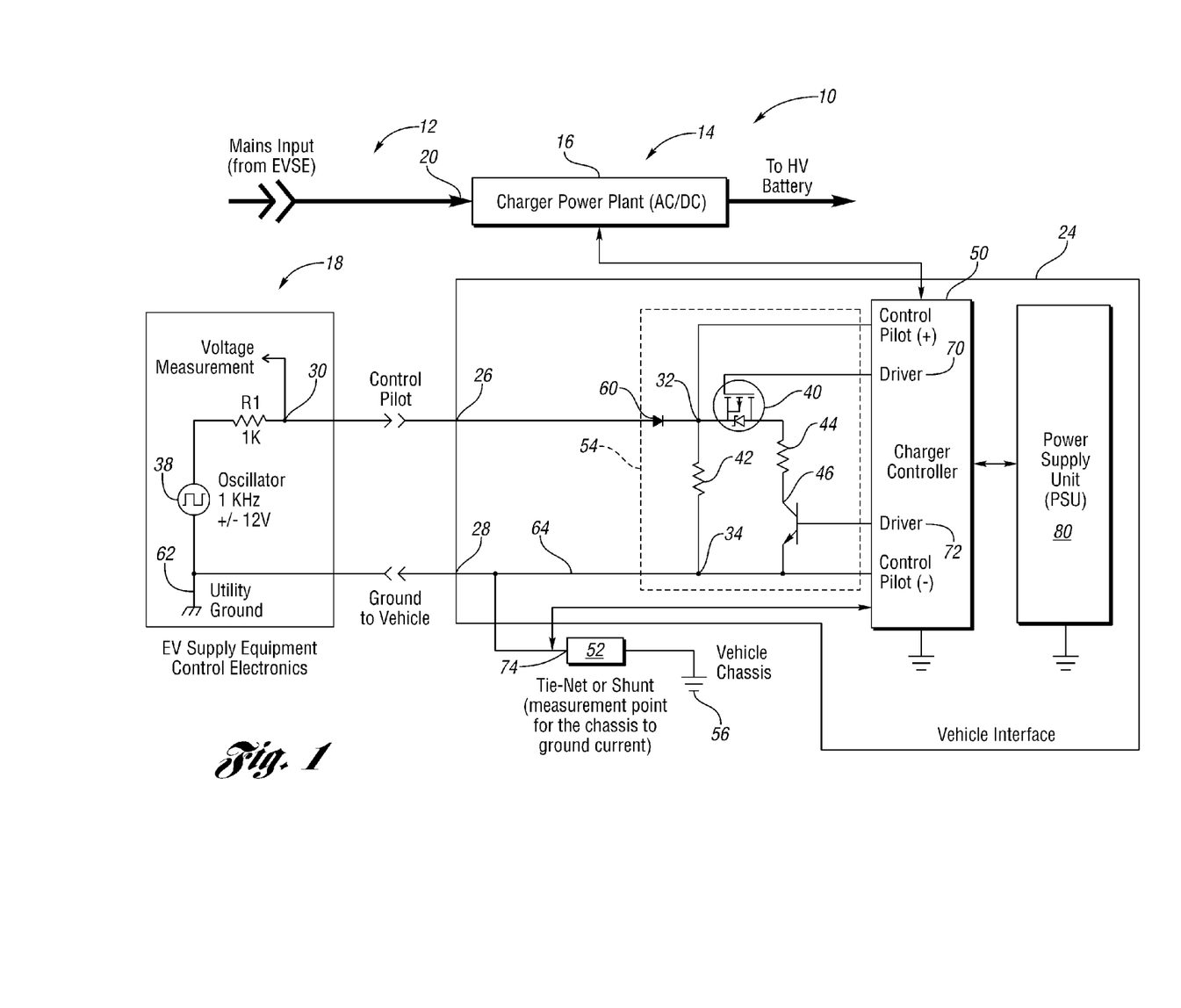
FIG. 1 illustrates a charging system as contemplated by one non-limiting aspect of the present invention.

FIG. 1 illustrates a charging system 10 having an Electric Vehicle Supply Equipment (EVSE) system 12 configured to provide energy to a vehicle charging system 14 as contemplated by one non-limiting aspect of the present invention. The EVSE system 12 may be configured to provide AC energy to a charger power plant 16 on the vehicle for conversion to DC energy sufficient for charging a high voltage (HV) battery (not shown) or other electronic storage element included within a vehicle. The EVSE system 12 may be associated with a wall outlet system or other system sufficiently configured to provide AC energy to the charger power plant 16, such as in the manner described within SAE J1772, the disclosure of which is hereby incorporated by reference in its entirety. In addition to or in place of detection logic or other features, the EVSE system 12 may include a control pilot circuit 18 through which the vehicle charging system 14 is required to communicate whether the charger power plant 16 is ready to receive the AC energy.

A cordset (not shown) may be configured to facilitate connecting the EVSE system 12 to a receptacle (not shown) included within the vehicle. The receptacle and/or another feature within the vehicle may include an input for connecting to a mains input 20 through which AC energy flows from the EVSE to the charger power plant 16 for conversion to energy sufficient for charging high voltage battery. A vehicle interface 24 may be included to facilitate connection with the control electronics portion 18 of the EVSE system. The vehicle interface 24 may include control pilot input 26 for receiving a control pilot signal from the EVSE system 12 and an earth/utility ground input 28 for connecting to an earth/utility ground of the EVSE system 12. The control electronics portion 18 and the vehicle interface 24 may be low voltage and/or low current systems and electrically isolated from the mains input 20. Once connected, the control pilot signal may be used to generate a voltage reference at voltage measurement nodes 30, 32, 34 to reflect whether the charger power plant 16 is ready to receive DC energy through the mains connection 20. A controller (not shown) associated with the EVSE system 12 may permit or deny delivery of the AC energy to the mains connection 20 depending on the reference voltage.

The control pilot signal may be generated using an oscillator 38 or other device having suitable capabilities to generate control pilot signal, including but not limited to the control pilot signal required by SAE 1772. The vehicle interface 24 may include a first switch 40, a first resistor 42, a second resistor 44, and a second switch 46 connected in series and in parallel to the first resistor 42. The first switch 40 and the second switch 46 may be operable between an open position and a closed position. The closed position may correspond to the switches 40, 46 conducting current and the open position may correspond with the switches 40, 46 being unable to conduct current. The "on" (closed position) and "off" (open position) switch voltages may be configured in accordance with the present invention as described below in more detail. In the absence of a contrary command, the first and second switches 40, 46 may be configured to maintain their current position, i.e., to remain in one of the open and closed positions when no signal is received commanding the switch to change positions. While the present invention fully contemplates use of a single one of the first and second switches 40, 46 facilitating setting the reference voltage, it is believed that use of both of the first and second switches 40, 46 may be more advantageous in order to ensure at least one of the switches opens when desired.

The voltage measured at the voltage measurement nodes 30, 32, 34 may vary depending on whether the first resistor 42 and the second resistor 44 being connected in parallel. The control pilot signal may be generated as at a constant DC voltage to facilitate measurement of a first and second reference voltage. Optionally, the control pilot signal may be output as an AC, PWM, signal or other time-varying signal sufficient to convey data and other information to the vehicle charging system, such as through corresponding voltage variations at the second measurement node 32. The use of the DC control pilot signal is predominately described to facilitate use of an EVSE controller (not shown) to adjust and/or prevent delivery of the AC energy to the mains connection 20 depending on whether the first reference voltage or second reference voltage is detected. Likewise, a charger controller 50 and/or a controller associate with the charger power plant may rely on detection of the first and second reference voltage to facilitate controlling charger operations. The first reference voltage may be associated with the first and second switches 40, 46 being in the closed position such that the first and second resistors 42, 44 are connected in parallel. The second reference voltage may be associated with either one of the first and second switches 40, 46 being in the open position such that the second resistor 44 is disconnected.

The vehicle charger controller 50 may be a Micro-Controller Unit (MCU) configured to monitor various operating conditions of the charger power plant 16 in order to assess whether the charger power plant 16 is ready to receive AC energy from the EVSE system 12. The vehicle charger controller 50 may also be configured to control various charging operations of the charger power plant 16, including assessing whether the HV battery or other element being charged is sufficiently charged or other conditions in which further delivery of the AC energy from the EVSE system 12 is undesirable. Upon completion of the charging event or other condition, the vehicle charger controller 50 may adjust control of the first and/or second switches 40, 46 in a manner sufficient to open the second switch 46, and thereby change the reference voltage and notify the EVSE controller to cease further delivery of AC energy. Optionally, the vehicle charging system 14 may include other means for communicating completion of the charging event to the EVSE system 12 such that the operations associated with opening the second switch 46 may be redundant or a secondary means for ensuring the EVSE controller is instructed to cease delivery of AC energy.

A shunt 52 may be connected in series between a reference circuit portion 54 of the vehicle interface 50 and a vehicle chassis ground 56. The reference portion 54 may correspond with the first and second switches 40, 46 and the first and second resistors 42, 44, and optionally, a protection diode 60. The positioning of the shunt 52 in series between the vehicle chassis ground 56 and an earth ground 62 associated with the EVSE system causes a corresponding reference circuit ground 64 of the reference circuit portion 54, which is approximately equal to the earth ground 62 of the EVSE system, to be different (greater/less) than the vehicle chassis ground 56. The amount by which the earth ground 62 is greater than the vehicle chassis ground 56 is in proportion to the resistive value of the shunt. This voltage differential between the earth ground and the vehicle chassis ground can produce common mode interferences and other electrical inconsistencies. One particular concern relates to switching operations or other electrical activities within the vehicle causing the shunt 52 to induce a voltage differential which prevents or otherwise hinders the capability of the charger controller 50 to bias the first and second switches 40, 46 to the desired open and/or closed position.

To limit the influence of this voltage differential, one non-limiting aspect of the present invention contemplates powering or otherwise controlling biasing of the first and second switches 40, 46 with first and second drivers 70, 72. The first and second drivers 70, 72 may be configured to operate independently of voltage interferences and differentials, and in particular, independently of electrical variations associated with use of the shunt 52 between the earth ground 62 and the vehicle chassis ground 56. The chassis ground 56 may correspond with a vehicle ground associated with a negative terminal of the low-voltage battery (not shown) included within the vehicle. The low voltage battery may be distinct from the high voltage battery used to facilitate electric driving and other high voltage electric operations of the vehicle. The low-voltage battery maybe a 12-16 V or 42 V DC battery configured to facilitate powering various vehicle electronics, as one having ordinary skill in the art will appreciate.

The shunt 52 may be included between the reference circuit portion 54 of the vehicle interface 24 and the chassis ground 56 in order to provide a feedback measurement to the charger controller 50. The charger controller 50 may be configured to monitor a third reference voltage 74 at the shunt 52 in order to detect inconsistencies or other interference concerns regarding the capability of the EVSE system 12 to properly facilitate the desired high voltage charging operation. The ability of the shunt 52 to provide this measurement may be useful in detecting whether charging being performed by the charger power plant 16 is operating properly as some improper operations may result in disturbances within the vehicle that are reflected in changes in the third reference voltage 74. For example, in the event the vehicle chassis ground 56 has been compromised in some way during a charging operation, the third reference voltage 74 may decrease due to a change in current through the shunt 52 such that the charger controller 50 may detect the variance and instigate an action to discontinue the charging operation.

A power supply unit 80 may be included to facilitate powering the charger controller 50 and/or the first and second drivers 70, 72 associated with controlling the first and second switches. The power supply unit 80 and the charger controller 50 may be directly connected to the vehicle chassis 56 in that the charger controller 50 and the power supply unit 80 bypass the shunt 52 to be grounded directly to the vehicle chassis ground 56. This type of configuration results in the reference circuit portion 54 of the vehicle interface 24 being associated with a non-local return ground in comparison to the charger controller 50 and the power supply unit 80 since the charger controller 50 and the power supply unit 80 bypass the shunt 52 to be connected directly to the vehicle chassis ground 56, i.e., the charger control 50 and the power supply unit 80 are not subject to the voltage differential induced by the shunt 52 between the vehicle chassis ground 56 in the earth ground/reference circuit ground 62, 64. In the event the shunt 52 were to be removed from the system 10, which is fully contemplated by the present invention, the reference circuit portion 54 would share the same ground as the vehicle chassis 56 such that the two would be approximately equal.

Figure 2:
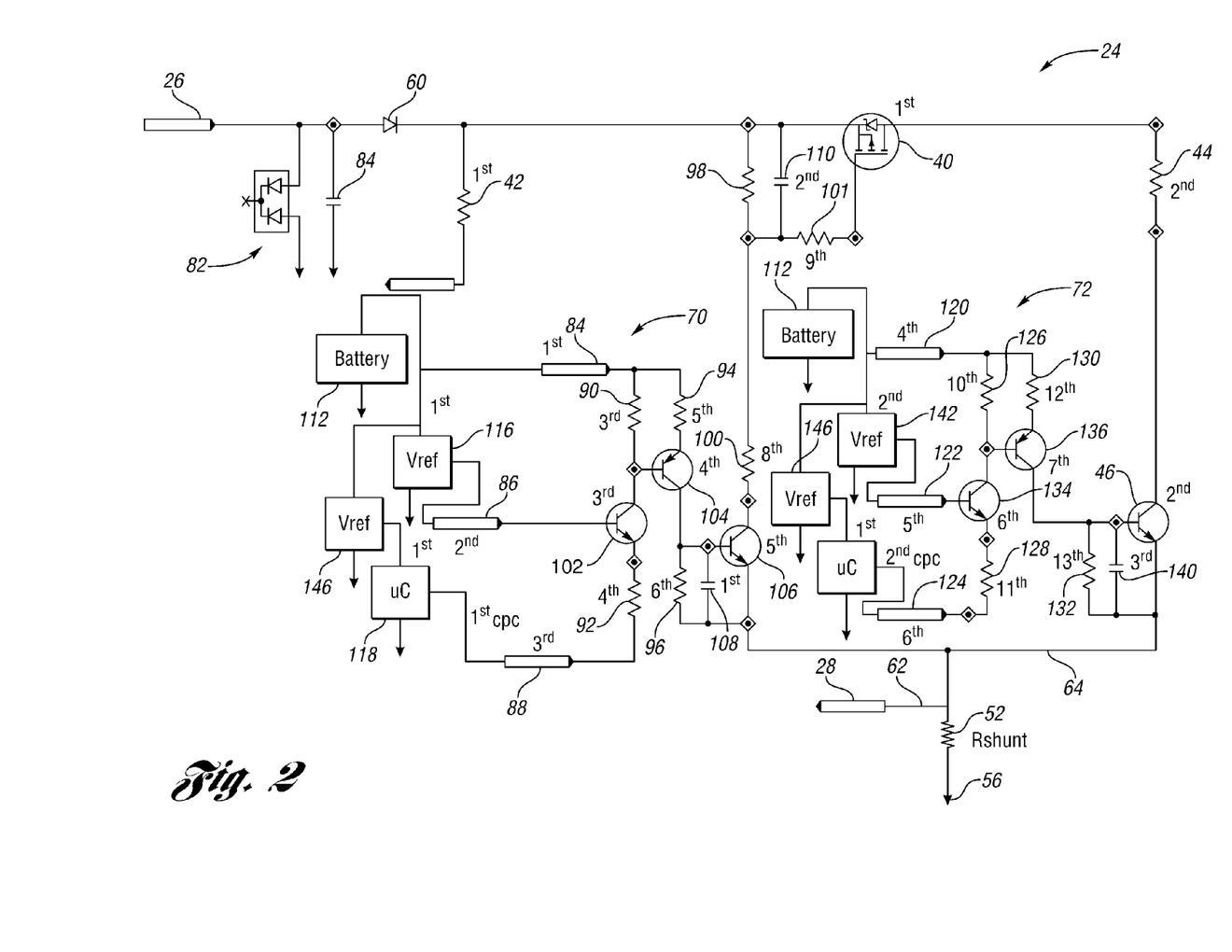
FIG. 2 illustrates a schematic of a vehicle interface as contemplated by one non-limiting aspect of the present invention.

FIG. 2 illustrates a schematic of the vehicle interface 24 as contemplated by one non-limiting aspect of the present invention. The control pilot input signal may be received at the control pilot input 26 of the vehicle interface 24. A diode combination 82 and capacitor 84 may be included to facilitate protecting the control pilot input 26 against electrostatic discharge pulses. The first and second switches 40, 46 are shown for exemplary non-limiting purposes as respectively corresponding with a MOSFET and BJT, however, the present invention fully contemplates the use of other switches, and particularly the use of relays, opto-switches, and/or solid-state relays. The biasing of the first and second switches 40, 46 may be facilitated with first and second driver circuits respectively associated with the first and second drivers 70, 72 of the charger controller 50. The first and second drivers 70, 72, interchangeably referred to as the first and second driver circuits, may be configured as constant current generators or other suitable devices sufficiently capable of facilitating biasing of the first and second switches 40, 46 between the open and/or closed positions independently of voltage variations and differentials resulting from the shunt 52 inducing non-local grounding of the reference circuit ground/earth ground 62, 64 relative to the vehicle chassis ground 56.

The first driver 70 may include a first input 84, a second input 86, a third input 88, a third resistor 90, a fourth resistor 92, a fifth resistor 94, a sixth resistor 96, a seventh resistor 98, an eighth resistor 100, a ninth resistor 101, a third switch 102, a fourth switch 104, a fifth switch 106, a first capacitor 108, and a second capacitor 110 connected such that: the first input 84 receives a first voltage from a low voltage battery 112 of the vehicle; the second input 86 receives a second voltage from a first voltage regulator 116 of the vehicle charging system; the third input 88 receives first control pilot controller (CPC) signal from a control pilot controller 118 associated with the vehicle charging system; a collector of the third switch 102 is connected in series with the third resistor 90 and the first input 84; a base of the third switch 102 is connected in series with the second input 86; an emitter of the third switch 102 is connected in series with the fourth resistor 92 to the third input 88; an emitter of the fourth switch 104 is connected in series with the fifth resistor 94 and the first input 84; a base of the fourth switch 104 is connected in series with the third resistor 90 and the first input 84; a base of the fifth switch 106 connected in series with a collector of the fourth switch 104; the sixth resistor 96 and the first capacitor 108 are connected in parallel between the collector and an emitter of the fifth switch 106; the sixth resistor 96 and the first capacitor 108 are connected in series with the shunt 52; the emitter of fifth switch 106 is connected in series with the shunt 52; a collector of the fifth switch 106 is connected in series with the seventh and eighth resistors 98, 100 to the control pilot input 26; and the seventh resistor 98 and the second capacitor 110 are connected in parallel and in series with the ninth resistor 101 across a source and a gate of the first switch 40.

The first driver 70 may be configured in this manner to control the first switch 40 to the closed position when the first CPC signal is "low". The first CPC signal may be considered to be "low" when a corresponding signal is output from the control pilot controller output 118 or other component of the charger controller 50 to the third input 88. The signal may be considered "low", for example, if the first CPC signal is at 0 VDC or other suitable voltage sufficient to active the third switch 102 to the "on" or conducting state, assuming as sufficient voltage is provided from the low voltage battery 112 to properly bias the third and fourth switches 102, 104 and the first regulator 116 properly biases the base of the third switch 102. The first driver 70 may be configured in a similar manner to control the first switch 40 to the open position when the first CPC signal is "high". The first CPC signal may be considered to be "high" when a corresponding signal is output from the controller output to the third input 88. The signal may be considered "high", for example, if the first CPC signal is at 5 VDC or other suitable voltage sufficient to deactivate the third switch 102 to the "off" or non-conducting state.

The second driver 72 may include a fourth input 120, a fifth input 122, and a sixth input 124, a tenth resistor 126, an eleventh resistor 128, a twelfth resistor 130, a thirteenth resistor 132, a sixth switch 134, a seventh switch 136 and a third capacitor 140 connected such that: the fourth input 120 receives a third voltage from the low voltage battery 112 of the vehicle; the fifth input 122 receives a fourth voltage from a second voltage regulator 142 of the vehicle charging system; the sixth input 124 receives a second CPC signal from the control pilot controller 118 associated with the vehicle charging system; a collector of the sixth switch 134 is connected in series with the tenth resistor 126 to the fourth input 120; a base of the sixth switch 134 is connected in series with the fifth input 122; an emitter of the sixth switch 134 is connected in series with the eleventh resistor 128 to the sixth input 124; a collector of the seventh switch 136 is connected in series with the twelfth resistor 130 to the fourth input 120; a base of the seventh switch 136 is connected in series with the tenth resistor 126 to the fourth input 120; a base of the second switch 46 is connected in series with the collector of the seventh switch 136; the thirteenth resistor 132 and the third capacitor 140 are connected in parallel between the base and emitter of the second switch 46; the emitter of the second switch 46 is connected in series with the shunt 52; and a collector of the second switch 46 is connected in series with the second resistor 44 and a drain of the first switch 40.

The second driver 72 may be configured in this manner to control the second switch 46 to the closed position when the second CPC signal is "low". The second CPC signal may be considered to be "low" when a corresponding signal is output from the control pilot controller output 118 or other component of the charger controller to the sixth input 134. The signal may be considered "low", for example, if the second CPC signal is at 0 VDC or other suitable voltage sufficient to active the sixth switch 134 to the "on" or conducting state, assuming as sufficient voltage is provided from the low voltage battery 112 to the properly bias the sixth and seventh switches 134, 136 and the second regulator 142 properly biases the base of the sixth switch 134. The second driver 72 may be configured in a similar manner to control the second switch 46 to the open position when the second CPC signal is "high". The second CPC signal may be considered to be "high" when a corresponding signal is output from the controller output to the sixth input 134. The signal may be considered "high", for example, if the second CPC signal is at 5 VDC or other suitable voltage sufficient to deactivate the sixth switch 134 to the "off" or non-conducting state.

As shown, an additional voltage regulator 146 (shown twice for effect) may optionally be connected to the controller output 118 to facilitate regulating its operation. Each of the voltage regulators 116, 142, 146 are shown to be directly connected or grounded to the vehicle chassis 56 such that they bypass the shunt 52, introducing an additional effect of the non-local grounding between the reference circuit 54 and the vehicle chassis 56. While the present invention contemplates locally grounding the regulators 116, 142, 146 and/or other components of the reference circuit 54 to the shunt 52 in order to enable working with a non-local ground, the illustrated configuration is believed to be advantageous for manufacturing and system self-monitoring as it may be beneficial in providing a modular solution to implementing the vehicle interface 24 without having to tie the corresponding electrical components to the earth/reference circuit ground 62, 64. The present invention particularly contemplates differentiating between the reference circuit/earth ground 62, 64 and the vehicle chassis ground 56 for this purpose and to demonstrate the advantageous capability of the first and second drivers 70, 72 in facilitating desired biasing/control of the first and second switches 40, 46 independently of voltage variations and common mode interference of the vehicle chassis ground 56 relative to the earth/reference circuit ground 62, 64.

The contemplated first and second drivers 70, 72 are designed to insure a desired biasing of the first and second switches 40, 46 by producing a sufficient voltage differential between the gate and source of the first switch and the base and emitter of the second switch, such as with the use of a constant current supply. The present invention, however, is not necessary limited to the illustrated configuration and fully contemplates the use of similar constant current generators as the illustrated first and second drivers to facilitate biasing other type of switches or relays that may be used in place of the illustrate MOSFET (first switch) and BJT (second switch).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interface operable with a vehicle charging system and an Electronic Vehicle Supply Equipment (EVSE) system, the vehicle charging system inverting AC energy from the EVSE system to facilitate charging a high voltage DC battery of a vehicle, the EVSE system delivering the AC energy to the vehicle charging system when a first reference voltage is received and preventing delivery of the AC energy when a second reference voltage is received, the vehicle interface comprising:

a control pilot input operable to receive a control pilot signal from the EVSE system;
an earth ground input operable to connect to an earth ground of the EVSE system;
a shunt input operable to connect the earth ground input in series with a shunt to a vehicle chassis ground;
a reference circuit operable to set the first and second reference voltages, the reference circuit including:
i) a first resistor connected in series between the control pilot input and the earth ground input;
ii) a first switch, a second resistor, and a second switch connected in series and in parallel to the first resistor, the first and second switches each being independently operable between an open position and a closed position;
iii) wherein the reference circuit facilitates the first reference voltage when both of the first and second switches are closed and the control pilot signal is received at the control pilot input; and
iv) wherein the reference circuit facilitates the second reference voltage when either one of the first and second switches is open and the control pilot signal is received at the control pilot input.

2. The vehicle interface of claim 1 further comprising:
a first driver configured to output a first signal to the first switch to control the first switch between the open position and the closed position; and
a second driver configured to output a second signal to the second switch to control the second switch between the open position and the closed position.

3. The vehicle interface of claim 2 wherein each of the first driver and the second driver are constant current generators.

4. The vehicle interface of claim 2 wherein each of the first driver and the second driver are grounded to the vehicle chassis ground.

5. The vehicle interface of claim 4 wherein each of the first resistor and the second switch connect to the earth ground input, thereby characterizing the first resistor and the second switch as being grounded to the earth ground.

6. The vehicle interface of claim 2 wherein the first driver and the second driver are included as at least a part of a charger controller, the charger controller bypassing the shunt to be connected directly to the vehicle chassis ground.

7. The vehicle interface of claim 1 wherein a reference circuit ground is equal to the earth ground, the reference circuit ground being different from the vehicle chassis ground in proportion to the shunt.

8. The vehicle interface of claim 2 wherein the first driver includes a first input, a second input, a third input, a third resistor, a fourth resistor, a fifth resistor, a sixth resistor, a seventh resistor, an eighth resistor, a ninth resistor, a third switch, a fourth switch, a fifth switch, a first capacitor, and a second capacitor connected such that:

i) the first input receives a first voltage from a low voltage battery of the vehicle;
ii) the second input receives a second voltage from a first voltage regulator of the vehicle charging system;
iii) the third input receives first control pilot controller (CPC) signal from a control pilot controller associated with the vehicle charging system;
iv) a collector of the third switch is connected in series with the third resistor and the first input;
v) a base of the third switch is connected in series with the second input;
vi) an emitter of the third switch is connected in series with the fourth resistor to the third input;
vii) an emitter of the fourth switch is connected in series with the fifth resistor and the first input;
viii) a base of the fourth switch is connected in series with the third resistor and the first input;
ix) a base of the fifth switch connected in series with a collector of the fourth switch;
x) the sixth resistor and the first capacitor are connected in parallel between the collector and an emitter of the fifth switch;
xi) the sixth resistor and the first capacitor are connected in series with the shunt;
xii) the emitter of fifth switch is connected in series with the shunt;
xiii) a collector of the fifth switch is connected in series with the seventh and eighth resistors to the control pilot input;
xiv) the seventh resistor and the second capacitor are connected in parallel and in series with the ninth resistor across a source and a gate of the first switch;
wherein the first driver controls the first switch to the closed position when the first CPC signal is low; and
wherein the first driver controls the first switch to the open position when the first CPC signal is high.

9. The vehicle interface of claim 2 wherein the second driver includes a fourth input, a fifth input, and a sixth input, a tenth resistor, an eleventh resistor, a twelfth resistor, a thirteenth resistor, a sixth switch, a seventh switch and a third capacitor connected such that:

i) the fourth input receives a third voltage from a low voltage battery of the vehicle ii) the fifth input receives a fourth voltage from a second voltage regulator of the vehicle charging system;
iii) the sixth input receives a second CPC signal from a control pilot controller associated with the vehicle charging system;
iv) a collector of the sixth switch is connected in series with the tenth resistor to the fourth input;
v) a base of the sixth switch is connected in series with the fifth input;
vi) an emitter of the sixth switch is connected in series with the eleventh resistor to the sixth input;
vii) a collector of the seventh switch is connected in series with the twelfth resistor to the fourth input;

viii) a base of the seventh switch is connected in series with the tenth resistor to the fourth input;
ix) a base of the second switch is connected in series with the collector of the seventh switch;
x) the thirteenth resistor and the third capacitor are connected in parallel between the base and emitter of the second switch and in series with the shunt;
xi) the emitter of the second switch is connected in series with the shunt;
xii) a collector of the second switch is connected in series with the second resistor and a drain of the first switch;
wherein the second driver controls the second switch to the closed position when the second CPC signal is low; and
wherein the second driver controls the second switch to the open position when the second CPC signal is high.

10. A charger controller operable with a reference circuit, the reference circuit being connected in series with a shunt to a vehicle chassis ground of a vehicle, the reference circuit being configured to generate one of a first reference voltage and a second reference voltage in response to receipt of a control pilot signal from an Electronic Vehicle Supply Equipment (EVSE) system, the reference circuit having a control pilot input operable to receive the control pilot signal of the EVSE system and an earth ground input operable to connect to an earth ground of the EVSE system, the reference circuit further including a first resistor connected in series between the control pilot input and the earth ground input, the reference circuit further including a first switch, a second resistor, and a second switch connected in series and in parallel to the first resistor, the first and second switches each being independently operable between an open position and a closed position, wherein the reference circuit generates the first reference voltage when both of the first and second switches are closed and the control pilot signal is received at the control pilot input, wherein the reference circuit generates the second reference voltage when either one of the first and second switches is open and the control pilot signal is received at the control pilot input, the charger controller comprising:
   a first driver for controlling the first switch between the open and closed positions;
   a second driver for controlling the second switch between the open and closed positions; and
   a power supply for powering the first and second drivers, the power supply bypassing the shunt to be connected directly to the vehicle chassis ground.

11. The charger controller claim 10 wherein the vehicle chassis ground corresponds with a negative terminal of a low voltage battery included within the vehicle and the shunt causes the earth ground input to be greater than the vehicle chassis ground.

12. The charger controller of claim 10 wherein the second switch is connected in series with the shunt.

13. The charger controller of claim 10 wherein the first driver includes a first input, a second input, a third input, a third resistor, a fourth resistor, a fifth resistor, a sixth resistor, a seventh resistor, an eighth resistor, a ninth resistor, a third switch, a fourth switch, a fifth switch, a first capacitor, and a second capacitor connected such that:
   i) the first input receives a first voltage from a low voltage battery of the vehicle;
   ii) the second input receives a second voltage from a first voltage regulator of the vehicle charging system;
   iii) the third input receives first control pilot controller (CPC) signal from a control pilot controller associated with the vehicle charging system;
   iv) a collector of the third switch is connected in series with the third resistor and the first input;

v) a base of the third switch is connected in series with the second input;
vi) an emitter of the third switch is connected in series with the fourth resistor to the third input;
vii) an emitter of the fourth switch is connected in series with the fifth resistor and the first input;
viii) a base of the fourth switch is connected in series with the third resistor and the first input;
ix) a base of the fifth switch connected in series with a collector of the fourth switch;
x) the sixth resistor and the first capacitor are connected in parallel between the collector and an emitter of the fifth switch;
xi) the sixth resistor and the first capacitor are connected in series with the shunt;
xii) the emitter of fifth switch is connected in series with the shunt;
xiii) a collector of the fifth switch is connected in series with the seventh and eighth resistors to the control pilot input;
xiv) the seventh resistor and the second capacitor are connected in parallel and in series with the ninth resistor across a source and a gate of the first switch;
wherein charger controller is configured to output the first CPC signal as low to control the first driver to control the first switch to the closed position; and
wherein charger controller is configured to output the first CPC signal as high to control the first driver to control the first switch to the open position.

14. The charger controller of claim 10 wherein the second driver includes a fourth input, a fifth input, and a sixth input, a tenth resistor, an eleventh resistor, a twelfth resistor, a thirteenth resistor, a sixth switch, a seventh switch and a third capacitor connected such that:
   i) the fourth input receives a third voltage from a low voltage battery of the vehicle
   ii) the fifth input receives a fourth voltage from a second voltage regulator of the vehicle charging system;
   iii) the sixth input receives a second CPC signal from a control pilot controller associated with the vehicle charging system;
   iv) a collector of the sixth switch is connected in series with the tenth resistor to the fourth input;
   v) a base of the sixth switch is connected in series with the fifth input;
   vi) an emitter of the sixth switch is connected in series with the eleventh resistor to the sixth input;
   vii) a collector of the seventh switch is connected in series with the twelfth resistor to the fourth input;
   viii) a base of the seventh switch is connected in series with the tenth resistor to the fourth input;
   ix) a base of the second switch is connected in series with the collector of the seventh switch;
   x) the thirteenth resistor and the third capacitor are connected in parallel between the base and emitter of the second switch and in series with the shunt;
   xi) the emitter of the second switch is connected in series with the shunt;
   xii) a collector of the second switch is connected in series with the second resistor and a drain of the first switch;
wherein charger controller is configured to output the second CPC signal as low to control the second driver to control the second switch to the closed position; and
wherein charger controller is configured to output the second CPC signal as high to control the second driver to control the second switch to the open position.

15. A vehicle charging system operable with an Electronic Vehicle Supply Equipment (EVSE) system configured to facilitate charging a high voltage battery included within a vehicle, the vehicle having a low voltage battery with a positive terminal and a negative terminal where the negative terminal defining a vehicle chassis ground, the system comprising:
- a reference circuit configured to receive a control pilot signal output from the EVSE system, the reference circuit processing the control pilot signal to generate at least one of a first reference voltage and a second reference voltage, the reference circuit having a reference circuit ground equal to an earth ground of the EVSE system;
- a shunt configured to connect the reference circuit in series with the vehicle chassis ground, wherein current through the shunt causes the reference circuit ground to be different from the vehicle chassis ground; and
- a charger controller operable to control the reference circuit to generate the at least one of the first reference voltage and the second reference voltage, the charger controller bypassing the shunt to be connected directly to the vehicle chassis ground.

16. The system of claim 15 wherein the charger controller includes at least one voltage regulator configured to facilitate powering at least a first switch and a second switch of the reference circuit, the at least one voltage regulator bypassing the shunt be connected and referenced directly to the vehicle chassis ground.

17. The system of claim 16 wherein at least one of the first switch and the second switch is connected in series with the shunt.

18. The system of claim 17 wherein the first switch is connected in series with the second switch such that an output of the second switch is directly connected to the shunt.

19. The system of claim 18 wherein the at least one voltage regulator is configured to power constant current generators associated with each of the first switch and the second switch.

20. The system of claim 15 wherein a charger controller ground is equal to the vehicle chassis ground.

* * * * *

UNITED STATES PATENT AND TRADEMARK OFFICE
CERTIFICATE OF CORRECTION

PATENT NO. : 9,112,373 B2  
APPLICATION NO. : 13/372803  
DATED : August 18, 2015  
INVENTOR(S) : Youssef Ghabbour et al.

Page 1 of 1

It is certified that error appears in the above-identified patent and that said Letters Patent is hereby corrected as shown below:

In the Claims:

Column 8, Line 29, Claim 8:

After "base of the fifth switch"  
Insert --is--

Column 8, Line 36, Claim 8:

After "the emitter of"  
Insert --the--

Column 8, Line 54, Claim 9:

After "battery of the vehicle"  
Insert a new line

Signed and Sealed this  
Eighth Day of March, 2016

Michelle K. Lee  
*Director of the United States Patent and Trademark Office*